US012247666B2

(12) United States Patent
Maetani et al.

(10) Patent No.: US 12,247,666 B2
(45) Date of Patent: Mar. 11, 2025

(54) SLIDING COMPONENT

(71) Applicant: EAGLE INDUSTRY CO., LTD., Tokyo (JP)

(72) Inventors: Yuki Maetani, Tokyo (JP); Yuta Negishi, Tokyo (JP); So Makishima, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 18/281,537

(22) PCT Filed: Mar. 1, 2022

(86) PCT No.: PCT/JP2022/008486
§ 371 (c)(1),
(2) Date: Sep. 11, 2023

(87) PCT Pub. No.: WO2022/190944
PCT Pub. Date: Sep. 15, 2022

(65) Prior Publication Data
US 2024/0151309 A1   May 9, 2024

(30) Foreign Application Priority Data
Mar. 12, 2021 (JP) ................... 2021-039779

(51) Int. Cl.
*F16J 15/34* (2006.01)
*F16C 33/10* (2006.01)

(52) U.S. Cl.
CPC ......... *F16J 15/3412* (2013.01); *F16C 33/107* (2013.01)

(58) Field of Classification Search
CPC .... F16J 15/00; F16J 15/16; F16J 15/50; F16J 15/52; F16J 15/53; F16J 15/34;
(Continued)

(56) References Cited

U.S. PATENT DOCUMENTS

| 3,085,808 A | 4/1963 | Williams | 277/388 |
| 3,232,680 A | 2/1966 | Clark | 384/110 |

(Continued)

FOREIGN PATENT DOCUMENTS

| CN | 1364987 | 8/2002 | ............... F16J 15/40 |
| CN | 2534429 | 2/2003 | ............... F16J 15/40 |

(Continued)

OTHER PUBLICATIONS

Definition of groove by Merriam Webster.
(Continued)

*Primary Examiner* — Nathan Cumar
(74) *Attorney, Agent, or Firm* — HAYES SOLOWAY P.C.

(57) ABSTRACT

A sliding component capable of maintaining high lubricity for a long period of time by efficiently using a liquid supplied between sliding surfaces is provided. An annular recess portion opening radially over the entire circumference is formed on an inner radial side or an outer radial side of at least one of a pair of sliding surfaces of the sliding component and a supply groove communicating with the annular recess portion and extending radially on the sliding surfaces is formed on at least one of the pair of sliding surfaces.

20 Claims, 11 Drawing Sheets

(58) Field of Classification Search
CPC .. F16J 15/3404; F16J 15/3408; F16J 15/3412; F16J 15/3416; F16J 15/342; F16C 33/00; F16C 33/10; F16C 33/1065; F16C 33/107
USPC .................................................... 277/347
See application file for complete search history.

(56) References Cited

U.S. PATENT DOCUMENTS

| | | | |
|---|---|---|---|
| 3,410,565 A | 11/1968 | Williams | 277/348 |
| 3,466,052 A | 9/1969 | Ludwig | |
| 3,499,653 A | 3/1970 | Gardner | 277/27 |
| 3,527,465 A | 9/1970 | Guinard | 277/400 |
| 3,656,227 A | 4/1972 | Weinand | 29/530 |
| 3,675,935 A | 7/1972 | Ludwig | |
| 3,782,737 A | 1/1974 | Ludwig | F16J 15/342 |
| 3,804,424 A | 4/1974 | Gardner | 277/27 |
| 3,855,624 A | 12/1974 | Reinhoudt | F16C 17/045 |
| 3,870,382 A | 3/1975 | Reinhoudt | G16C 17/045 |
| 4,406,466 A | 9/1983 | Geary, Jr. | 277/347 |
| 4,486,026 A | 12/1984 | Furumura et al. | 277/80 |
| 4,523,764 A | 6/1985 | Albers | F16J 15/342 |
| 4,645,414 A | 2/1987 | DeHart | F04D 17/161 |
| 5,092,612 A | 3/1992 | Victor | 277/400 |
| 5,133,562 A | 7/1992 | Lipschitz | F16J 15/342 |
| 5,201,531 A * | 4/1993 | Lai | F16J 15/3412 |
| | | | 277/400 |
| 5,222,743 A | 6/1993 | Goldswain | 277/400 |
| 5,385,409 A | 1/1995 | Ide | F16J 15/3432 |
| 5,441,283 A | 8/1995 | Pecht et al. | 277/96.1 |
| 5,447,316 A | 9/1995 | Matsui | F16J 15/34 |
| 5,492,341 A | 2/1996 | Pecht | 277/400 |
| 5,496,047 A | 3/1996 | Goldswain | F16J 15/3412 |
| 5,498,007 A * | 3/1996 | Kulkarni | F16J 15/3412 |
| | | | 277/408 |
| 5,501,470 A | 3/1996 | Fuse | 277/400 |
| 5,529,318 A | 6/1996 | Fuse | F16J 15/3412 |
| 5,556,111 A * | 9/1996 | Sedy | F16C 33/741 |
| | | | 277/400 |
| 5,605,339 A | 2/1997 | Pecht | F16J 15/3412 |
| 5,664,787 A | 9/1997 | Fuse et al. | F16J 15/34 |
| 5,702,110 A | 12/1997 | Sedy | |
| 5,895,051 A | 4/1999 | Bowers | B62D 5/22 |
| 6,142,478 A | 11/2000 | Pecht | F16J 15/3484 |
| 6,189,896 B1 | 2/2001 | Dickey et al. | F16L 17/06 |
| 6,446,976 B1 | 9/2002 | Key | 277/367 |
| 6,575,470 B1 | 6/2003 | Gacek | F16J 15/3412 |
| 6,817,766 B2 | 11/2004 | Gomyo | F16C 32/06 |
| 7,044,470 B2 | 5/2006 | Zheng | F16J 15/342 |
| 7,510,330 B2 | 3/2009 | Obara | F16C 32/06 |
| 7,568,839 B2 | 8/2009 | Gotoh et al. | F16C 32/06 |
| 7,744,094 B2 | 6/2010 | Yanagisawa | F16J 15/342 |
| 7,758,051 B2 | 7/2010 | Roberts-Haritonov et al. | |
| | | | F16J 15/34 |
| 7,780,399 B1 | 8/2010 | Garrison | F01D 25/183 |
| 8,162,322 B2 | 4/2012 | Flaherty | F16J 15/3412 |
| 9,062,775 B2 * | 6/2015 | Short | F16J 15/3412 |
| 9,353,865 B2 | 5/2016 | Lattin | F16N 21/00 |
| 9,353,867 B2 | 5/2016 | Itadani | F16J 15/342 |
| 9,371,912 B2 * | 6/2016 | Hosoe | F16J 15/34 |
| 9,587,745 B2 | 3/2017 | Itadani et al. | F16J 15/342 |
| 9,611,938 B1 | 4/2017 | Itadani | F16J 15/3416 |
| 9,677,670 B2 * | 6/2017 | Itadani | F16J 15/342 |
| 9,829,109 B2 | 11/2017 | Itadani et al. | F16J 15/3412 |
| 9,845,886 B2 * | 12/2017 | Itadani | F16C 33/72 |
| 9,951,873 B2 * | 4/2018 | Inoue | F16J 15/162 |
| 9,964,216 B2 * | 5/2018 | Inoue | F16J 15/3424 |
| 9,982,784 B2 | 5/2018 | Osada et al. | F16J 15/34 |
| 10,054,230 B2 | 8/2018 | Katori | F16J 15/34 |
| 10,072,759 B2 | 9/2018 | Inoue et al. | F16J 15/34 |
| 10,113,648 B2 | 10/2018 | Inoue et al. | F16J 15/342 |
| 10,190,689 B2 | 1/2019 | Yoshida | F16J 15/3412 |
| 10,337,560 B2 | 7/2019 | Takunaga | F16C 33/80 |
| 10,337,620 B2 | 7/2019 | Tokunaga et al. | F16J 15/342 |
| 10,352,450 B2 | 7/2019 | Yamanaka et al. | F16J 15/3204 |
| 10,408,349 B2 | 9/2019 | Miyazaki | F16J 15/3272 |
| 10,473,220 B2 | 11/2019 | Tokunaga et al. | F16J 15/34 |
| 10,487,944 B2 * | 11/2019 | Itadani | F16J 15/3496 |
| 10,487,948 B2 | 11/2019 | Inoue et al. | F16J 15/342 |
| 10,495,228 B2 | 12/2019 | Itadani et al. | F16J 15/34 |
| 10,648,569 B2 | 5/2020 | Itadani | F16K 15/34 |
| 10,655,736 B2 * | 5/2020 | Itadani | F16J 15/3416 |
| 10,704,417 B2 | 7/2020 | Tokunaga et al. | F01D 25/16 |
| 10,781,924 B2 | 9/2020 | Inoue et al. | F16J 15/342 |
| 10,883,603 B2 | 1/2021 | Inoue et al. | F16J 15/342 |
| 10,883,604 B2 | 1/2021 | Inoue et al. | F16J 15/342 |
| 11,009,072 B2 | 5/2021 | Kimura et al. | F16J 15/34 |
| 11,009,130 B2 * | 5/2021 | Itadani | F16J 15/34 |
| 11,053,974 B2 * | 7/2021 | Negishi | F16C 33/107 |
| 11,125,335 B2 | 9/2021 | Kimura et al. | F16J 15/34 |
| 11,221,071 B2 | 1/2022 | Sasaki | F16C 17/04 |
| 11,525,512 B2 | 12/2022 | Kimura | F16J 15/3412 |
| 11,530,749 B2 | 12/2022 | Kimura | F16J 15/441 |
| 11,603,934 B2 | 3/2023 | Imura | F16J 15/3412 |
| 11,644,100 B2 | 5/2023 | Kimura | F16J 15/324 |
| 11,892,081 B2 | 2/2024 | Inoue et al. | F16J 15/3412 |
| 2002/0093141 A1 | 7/2002 | Wang | 277/358 |
| 2003/0178781 A1 | 9/2003 | Tejima | |
| 2003/0189294 A1 | 10/2003 | Tejima | F16J 15/34 |
| 2004/0080112 A1 | 4/2004 | Tejima | 277/306 |
| 2005/0135714 A1 | 6/2005 | Rahman | F16C 17/107 |
| 2005/0141789 A1 | 6/2005 | Kita et al. | F16C 32/06 |
| 2005/0212217 A1 | 9/2005 | Tejima | 277/399 |
| 2006/0093245 A1 | 5/2006 | Han | G11B 19/2018 |
| 2007/0296156 A1 | 12/2007 | Yanagisawa et al. | F16J 15/34 |
| 2008/0100001 A1 | 5/2008 | Flaherty | 277/400 |
| 2008/0272552 A1 | 11/2008 | Zheng | 277/400 |
| 2010/0066027 A1 | 3/2010 | Vasagar | 277/350 |
| 2011/0101616 A1 | 5/2011 | Teshima | 277/358 |
| 2012/0018957 A1 | 1/2012 | Watanabe | 277/387 |
| 2013/0209011 A1 * | 8/2013 | Tokunaga | F16C 33/74 |
| | | | 384/123 |
| 2014/0203517 A1 | 7/2014 | Ferris | F16K 15/3412 |
| 2015/0115537 A1 | 4/2015 | Tokunaga | F16J 15/34 |
| 2015/0115540 A1 | 4/2015 | Tokunaga | F16J 15/34 |
| 2015/0123350 A1 | 5/2015 | Itadani | 277/400 |
| 2015/0184752 A1 | 7/2015 | Itadani | F16J 15/3412 |
| 2015/0226334 A1 * | 8/2015 | Itadani | F16J 15/342 |
| | | | 277/400 |
| 2015/0240950 A1 | 8/2015 | Takahashi | F16J 15/363 |
| 2015/0260292 A1 * | 9/2015 | Inoue | F16J 15/3412 |
| | | | 277/400 |
| 2015/0377297 A1 * | 12/2015 | Tokunaga | F16C 17/026 |
| | | | 384/119 |
| 2015/0377360 A1 | 12/2015 | Itadani | F16J 15/3412 |
| 2016/0003361 A1 | 1/2016 | Takahashi | F16J 15/3408 |
| 2016/0033045 A1 * | 2/2016 | Itadani | F16J 15/348 |
| | | | 277/348 |
| 2016/0097457 A1 | 4/2016 | Sun et al. | F16J 15/34 |
| 2016/0252182 A1 * | 9/2016 | Itadani | F16J 15/342 |
| | | | 277/401 |
| 2017/0009889 A1 | 1/2017 | Seki | F16J 15/3272 |
| 2017/0114902 A1 | 4/2017 | Itadani | F16J 15/3412 |
| 2017/0130844 A1 | 5/2017 | Itadani | F16J 15/3412 |
| 2017/0167615 A1 * | 6/2017 | Itadani | F16J 15/3412 |
| 2017/0198814 A1 * | 7/2017 | Colombo | F16J 15/3412 |
| 2017/0234431 A1 * | 8/2017 | Katori | F16J 15/342 |
| | | | 277/400 |
| 2017/0241549 A1 * | 8/2017 | Itadani | F16J 15/40 |
| 2018/0051809 A1 | 2/2018 | Yoshida | F16J 15/3412 |
| 2018/0058584 A1 | 3/2018 | Miyazaki | F16J 15/164 |
| 2018/0073394 A1 | 3/2018 | Tokunaga et al. | F01D 25/183 |
| 2018/0128377 A1 * | 5/2018 | Tokunaga | F16J 15/34 |
| 2018/0128378 A1 | 5/2018 | Tokunaga et al. | F16J 15/342 |
| 2018/0135699 A1 * | 5/2018 | Tokunaga | F16J 15/348 |
| 2018/0187785 A1 * | 7/2018 | Katori | F16J 15/3416 |
| 2018/0195618 A1 * | 7/2018 | Itadani | F16J 15/342 |
| 2019/0178386 A1 | 6/2019 | Arai | F16J 15/3496 |
| 2019/0301522 A1 * | 10/2019 | Negishi | F16C 17/045 |
| 2019/0376558 A1 | 12/2019 | Kimura | F16C 33/743 |
| 2020/0182299 A1 | 6/2020 | Kimura | F16C 17/026 |
| 2021/0054935 A1 | 2/2021 | Kimura | F16J 15/3412 |
| 2021/0080006 A1 | 3/2021 | Sasaki | F16J 15/34 |
| 2021/0116029 A1 | 4/2021 | Kimura | F16J 15/324 |
| 2021/0116030 A1 | 4/2021 | Kimura | |

(56) References Cited

U.S. PATENT DOCUMENTS

| | | | | |
|---|---|---|---|---|
| 2021/0116032 A1 | 4/2021 | Kimura | ............... | F16J 15/188 |
| 2021/0164571 A1 | 6/2021 | Kimura | ............... | F16J 15/3412 |
| 2022/0010835 A1 | 1/2022 | Inoue | ............... | F16C 17/045 |
| 2022/0099191 A1 | 3/2022 | Suzuki | ............... | F16C 33/103 |
| 2022/0145992 A1 | 5/2022 | Miyazaki | ............... | F16C 33/107 |
| 2022/0275828 A1 | 9/2022 | Inoue | ............... | F16J 15/3424 |
| 2023/0258184 A1 | 8/2023 | Suzuki | ............... | F04C 29/00 |

FOREIGN PATENT DOCUMENTS

| | | | | |
|---|---|---|---|---|
| CN | 1401924 | 3/2003 | ............... | F16J 15/16 |
| CN | 101749431 | 6/2010 | ............... | F16J 15/34 |
| CN | 101776152 | 7/2010 | ............... | F16J 15/48 |
| CN | 201582390 | 9/2010 | ............... | F16J 15/16 |
| CN | 103267132 | 8/2013 | ............... | F16J 15/54 |
| CN | 103732958 | 4/2014 | ............... | F16J 15/34 |
| CN | 103791097 | 5/2014 | ............... | F16J 15/34 |
| CN | 104019237 | 9/2014 | ............... | F16J 15/16 |
| CN | 104165229 | 11/2014 | ............... | F16J 15/40 |
| CN | 105683632 | 6/2016 | ............... | F04D 29/10 |
| CN | 106439037 | 2/2017 | ............... | F16J 15/34 |
| CN | 206017723 | 3/2017 | ............... | F16J 15/16 |
| CN | 107166036 | 9/2017 | ............... | F16J 15/16 |
| CN | 107532724 | 1/2018 | ............... | F16J 15/34 |
| CN | 107676484 | 2/2018 | ............... | F16J 15/3232 |
| CN | 108506494 | 9/2018 | ............... | F16J 15/34 |
| DE | 3619489 | 12/1987 | ............... | F16J 15/34 |
| DE | 4407453 | 9/1995 | ............... | F16C 17/08 |
| EP | 0637706 | 8/1993 | ............... | F16J 15/34 |
| EP | 0896163 | 2/1999 | ............... | F16C 33/10 |
| EP | 2520835 | 11/2012 | ............... | F16J 15/34 |
| EP | 2626604 | 8/2013 | ............... | F16J 15/34 |
| EP | 2977655 | 1/2016 | ............... | F16J 15/34 |
| EP | 3091258 | 11/2016 | ............... | F16J 15/34 |
| EP | 3299686 | 3/2018 | ............... | F16J 15/34 |
| EP | 3514414 | 7/2019 | ............... | F16J 15/34 |
| EP | 3922872 | 12/2021 | ............... | F16J 15/34 |
| EP | 3926187 | 12/2021 | ............... | F16C 17/04 |
| EP | 3926188 | 12/2021 | ............... | F16C 17/04 |
| EP | 3943765 | 1/2022 | ............... | F16C 17/04 |
| GB | 1509482 | 5/1978 | ............... | F16C 33/10 |
| JP | 36-6305 | 5/1961 | | |
| JP | S49-33614 | 9/1974 | ............... | F16J 15/34 |
| JP | S54-77305 | 6/1979 | ............... | B06B 9/10 |
| JP | S55-177549 | 12/1980 | ............... | F16J 15/16 |
| JP | S57-146955 | 9/1982 | ............... | F16J 15/34 |
| JP | 58-109771 | 6/1983 | ............... | F16J 15/34 |
| JP | 58-137667 | 8/1983 | ............... | F16J 15/40 |
| JP | S59-58252 | 4/1984 | ............... | F16J 15/34 |
| JP | S60-107461 | 7/1985 | ............... | B63H 23/36 |
| JP | S6182177 | 5/1986 | ............... | F16J 15/34 |
| JP | S62-37572 | 2/1987 | ............... | F16J 51/34 |
| JP | S63-033027 | 3/1988 | ............... | F16C 33/46 |
| JP | S63-190975 | 8/1988 | ............... | F16J 15/34 |
| JP | H01133572 | 9/1989 | ............... | F16J 15/34 |
| JP | 2-236067 | 9/1990 | ............... | F16J 15/34 |
| JP | 3-14371 | 2/1991 | ............... | F16J 15/34 |
| JP | 3-35372 | 4/1991 | ............... | F16J 15/34 |
| JP | 3-41267 | 4/1991 | ............... | F16J 15/34 |
| JP | 3-41268 | 4/1991 | ............... | F16J 15/34 |
| JP | H04-73 | 1/1992 | ............... | F16J 15/34 |
| JP | H04-145267 | 5/1992 | ............... | F16J 15/34 |
| JP | H04-96671 | 8/1992 | ............... | F16J 15/34 |
| JP | H05-90048 | 12/1993 | ............... | F16J 15/34 |
| JP | H05-322050 | 12/1993 | ............... | F16J 15/34 |
| JP | H07-55016 | 3/1995 | ............... | F16J 15/34 |
| JP | H08-89489 | 4/1996 | ............... | A61B 5/05 |
| JP | H09-503276 | 3/1997 | ............... | F16J 15/34 |
| JP | H09-329247 | 12/1997 | ............... | F16J 15/34 |
| JP | H10-38093 | 2/1998 | ............... | F16J 15/34 |
| JP | H10-281299 | 10/1998 | ............... | F16J 15/34 |
| JP | 2000-179543 | 6/2000 | ............... | F16C 17/10 |
| JP | 2001-295833 | 10/2001 | ............... | F16C 17/04 |
| JP | 2001-317638 | 11/2001 | ............... | F16J 15/34 |
| JP | 2003-161322 | 6/2003 | ............... | F16C 33/10 |
| JP | 2003-343741 | 12/2003 | ............... | F16J 15/34 |
| JP | 2004-003578 | 1/2004 | ............... | F16J 15/34 |
| JP | 2005-188651 | 7/2005 | ............... | F16J 15/34 |
| JP | 2005-58051 | 12/2005 | ............... | F16C 33/74 |
| JP | 2006-9828 | 1/2006 | ............... | F16C 17/02 |
| JP | 2006-022834 | 1/2006 | ............... | F16J 15/34 |
| JP | 2006-77899 | 3/2006 | ............... | F16J 15/34 |
| JP | 2008-144864 | 6/2008 | ............... | F16C 33/10 |
| JP | 2009-250378 | 10/2009 | ............... | F16J 15/34 |
| JP | 2010-133496 | 6/2010 | ............... | F16J 15/34 |
| JP | 2010-216587 | 9/2010 | ............... | F16J 15/34 |
| JP | 2011-185292 | 9/2011 | ............... | F16J 15/34 |
| JP | 2011-196429 | 10/2011 | ............... | F16J 15/34 |
| JP | 2012-2295 | 1/2012 | ............... | F16J 15/34 |
| JP | 5271858 | 5/2013 | ............... | F16J 15/34 |
| JP | WO2014042045 | 3/2014 | ............... | F16J 15/34 |
| JP | 2016-80090 | 5/2016 | ............... | F16J 15/34 |
| JP | 2017-053423 | 3/2017 | ............... | F16J 15/10 |
| JP | 2017-141961 | 8/2017 | ............... | F16J 15/34 |
| JP | 6444492 | 12/2018 | ............... | F16J 15/34 |
| JP | 2019-13446 | 1/2019 | ............... | A47J 27/00 |
| JP | 2019-15401 | 1/2019 | ............... | F16J 15/34 |
| JP | 2019-173953 | 10/2019 | ............... | F04D 29/12 |
| JP | 2019-173955 | 10/2019 | ............... | F04D 29/12 |
| JP | 2019-173956 | 10/2019 | ............... | F04D 29/12 |
| JP | 2019173956 A * | 10/2019 | | |
| JP | 2020-173020 | 10/2020 | ............... | F16C 33/74 |
| WO | WO9506832 | 3/1995 | ............... | F16J 15/34 |
| WO | WO2012046749 | 4/2012 | ............... | F16J 15/34 |
| WO | WO2014024742 | 2/2014 | ............... | F16J 15/34 |
| WO | WO2014050920 | 4/2014 | ............... | F16J 15/34 |
| WO | WO2014103630 | 7/2014 | ............... | F16J 15/34 |
| WO | WO2014103631 | 7/2014 | ............... | F16J 15/34 |
| WO | WO2014112455 | 7/2014 | ............... | F16J 15/34 |
| WO | WO2014148316 | 9/2014 | ............... | F16J 15/34 |
| WO | WO2014174725 | 10/2014 | ............... | F16J 15/34 |
| WO | WO2016009408 | 1/2016 | ............... | F16J 15/34 |
| WO | WO2016035860 | 3/2016 | ............... | F16J 15/34 |
| WO | WO2016167262 | 10/2016 | ............... | F16J 15/34 |
| WO | WO2016186019 | 11/2016 | ............... | F16J 15/34 |
| WO | WO2016203878 | 12/2016 | ............... | F16J 15/34 |
| WO | WO2017002646 | 1/2017 | ............... | F16J 15/34 |
| WO | WO2017002774 | 1/2017 | ............... | F16J 15/34 |
| WO | WO2018034197 | 2/2018 | ............... | F16J 15/34 |
| WO | WO2018105505 | 6/2018 | ............... | F16J 15/34 |
| WO | WO2018139231 | 8/2018 | ............... | F16J 15/34 |
| WO | WO2018139232 | 8/2018 | ............... | F16C 33/10 |
| WO | WO2021020074 | 2/2021 | ............... | F16C 17/04 |

OTHER PUBLICATIONS

International Search Report, Written Opinion and International Preliminary Report on Patentability issued in PCT/JP2022/008486, dated Apr. 18, 2022, with English translation, 32 pages.
International Search Report, Written Opinion and International Preliminary Report on Patentability issued in PCT/JP2022/013242, dated Jun. 7, 2022, with English translation, 24 pages.

* cited by examiner

SLIDING COMPONENT

TECHNICAL FIELD

The present invention relates to a sliding component including a pair of annular bodies that rotates relative to each other and are used for, for example, a shaft sealing device sealing a rotating shaft of a rotating machine in an automotive seal field, a general industrial machinery seal field, or another seal field or a bearing of a machine in an automotive bearing field, a general industrial machinery bearing field, or another bearing field.

BACKGROUND ART

Conventionally, a lubricant is applied between sliding surfaces of a pair of annular bodies that constitute a sliding component that rotate relative to each other to reduce friction. However, the lubricant applied between the sliding surfaces is pushed out from between the sliding surfaces due to the relative rotation of the annular bodies and gradually decreases. As a result, a problem arises in that lubricity cannot be maintained for a long period of time.

For example, as a sliding component used for a shaft sealing device that seals a rotating shaft of a rotating machine such as a pump or turbine and prevents a leakage of a sealed fluid, there is known a mechanical seal including a stationary seal ring and a rotating seal ring which rotate relative to each other and slide on each other on flat end surfaces thereof (for example, see Patent Citation 1) as an annular body. The stationary seal ring is fixed to a housing. The rotating seal ring is fixed to the rotating shaft and rotates together with the rotating shaft. For such a mechanical seal, it is particularly important to maintain lubricity for a long period of time in order to prevent abrasion of the sliding surface while maintaining sealing performance.

If a sealed fluid or a leakage side fluid is a liquid such as oil, the mechanical seal can use the fluid for lubrication by allowing the liquid to enter between the sliding surfaces. However, when the sealed fluid is a gas and the fluid in a space on the leakage side is also a gas, the lubricant applied between the sliding surfaces is pushed out from between the sliding surfaces as time goes on due to the relative rotation between the annular bodies and hence satisfactory lubricity cannot be maintained for a long period of time. Here, when both the sealed fluid and the fluid in the space on the leakage side are gas, it has been widely attempted to maintain lubricity by dripping a small amount of liquid as a lubricant to supply the liquid between the sliding surfaces.

CITATION LIST

Patent Literature

Patent Citation 1: JP 2017-53423 A (Page 4, FIG. 1)

SUMMARY OF INVENTION

Technical Problem

However, the liquid that is supplied by such as dripping on the edge of any one of the inner radial side and the outer radial side of the sliding surface is not easily guided from a small gap between the sliding surfaces toward the center of the sliding surface in the radial direction during the relative rotation of the pair of annular bodies. Additionally, the lubricant tends to be thrown off to the inner radial side or the outer radial side due to the relative rotation of the pair of annular bodies, and the supplied liquid does not effectively contribute to the improvement of the lubricity. As a result, a problem arises in that high lubricity cannot be maintained for a long period of time.

The present invention has been made in view of such problems and an object of the present invention is to provide a sliding component capable of maintaining high lubricity for a long period of time by efficiently using a liquid supplied between sliding surfaces.

Solution to Problem

In order to solve the foregoing problem, a sliding component according to the present invention is a sliding component including: a pair of annular bodies arranged at relatively rotating positions to face each other when driving a rotating machine, wherein an annular recess portion opening radially over entire circumference is formed on an inner radial side or an outer radial side of at least one of a pair of sliding surfaces of the sliding component and a supply groove communicating with the annular recess portion and extending radially on the sliding surface is formed on at least one of the pair of sliding surfaces. According to the foregoing feature of the present invention, since the annular recess portion is formed to communicate with the supply groove and to open in the radial direction, the annular recess portion can easily take in the liquid and the annular recess portion or the supply groove can hold a large amount of liquid. Accordingly, it is possible to efficiently introduce the liquid between the sliding surfaces. In this way, it is possible to maintain high lubricity for a long period of time by efficiently using the liquid supplied between the sliding surfaces.

It may be preferable that a dynamic pressure generation groove portion is provided to communicate with the supply groove and to extend in a circumferential direction in which the annular bodies rotate relatively to each other. According to this preferable configuration, the liquid is guided from the supply groove to the dynamic pressure generation groove portion due to the relative rotation of the annular body, a dynamic pressure is generated at the terminal end inside the dynamic pressure generation groove portion, and the sliding surfaces are separated from each other by the dynamic pressure to form a liquid film. Accordingly, lubricity is improved. Further, since the liquid is guided from the supply groove to the dynamic pressure generation groove portion, the liquid is easily drawn from the annular recess portion toward the supply groove.

It may be preferable that a single annular groove extending in the circumferential direction communicates with a terminal end of the supply groove. According to this preferable configuration, since the liquid is collected from the terminal end of the supply groove to the annular groove and is circulated in the circumferential direction, the discharge of the liquid can be suppressed.

It may be preferable that at least one negative pressure generation groove portion is provided to communicate with the annular groove and to extend in a circumferential direction in which the annular bodies rotate relatively to each other. According to this preferable configuration, since the liquid is returned from the negative pressure generation groove portion to the annular groove due to the relative rotation of the annular body, the discharge of the liquid can be suppressed.

It may be preferable that a plurality of the supply grooves are equally arranged in the circumferential direction of the sliding surface. According to this preferable configuration, the liquid is equally guided to the sliding surface at a plurality of positions in the circumferential direction and the liquid can be efficiently held over the entire circumference of the annular recess portion.

It may be preferable that the annular recess portion and the supply groove are formed on the annular body fixed to a fixed side of the rotating machine. According to this preferable configuration, since there is no influence of the centrifugal force in the annular body fixed to the fixed side of the rotating machine, the discharge of the liquid entering the annular recess portion and the supply groove is suppressed and hence the lubricity can be maintained for a long period of time.

It may be preferable that the supply groove is formed deeper than the annular recess portion and opened to an inner radial side or an outer radial side of at least one of the pair of sliding surfaces of the sliding component. According to this preferable configuration, even when the liquid supply amount is relatively large, the liquid does not easily return from the supply groove to the annular recess portion and the liquid can be easily held on the sliding surface.

It may be preferable that the supply groove is formed deeper than the annular recess portion and may communicate with a side opposite to an opening of the annular recess portion. According to this preferable configuration, since the supply groove can easily take in the liquid and a large amount of liquid can be held inside the supply groove, it is possible to maintain the lubricity even when the supply amount of the lubricant is small.

It may be preferable that the supply groove is formed shallower than the annular recess portion and deeper than the dynamic pressure generation groove portion communicating with the supply groove and extending in the circumferential direction in which the annular bodies rotate relatively to each other. According to this preferable configuration, a relatively large amount of liquid can be held in the deeply formed annular recess portion and the liquid is likely to move inside the shallowly formed supply groove in the radial direction and can be reliably guided to the dynamic pressure generation groove portion.

It may be preferable that the annular recess portion and the supply groove communicate with each other at a same depth. According to this preferable configuration, the liquid is smoothly guided from the annular recess portion to the supply groove.

It may be preferable that the sliding component constitutes an outside-typed mechanical seal which seals a leakage of a sealed fluid located on a radially inner peripheral side toward a radially outer peripheral side. According to this preferable configuration, since the annular recess portion is formed on the outer peripheral side, a large capacity for holding liquid can be ensured.

In addition, the extension of the supply groove of the sliding component according to the present invention in the radial direction may be the extension of the supply groove with at least a radial component. Further, the extension of the negative pressure generation groove portion in the circumferential direction of the relative rotation may be the extension of the negative pressure generation groove portion with at least a circumferential component.

DESCRIPTION OF EMBODIMENTS

Figure 1:
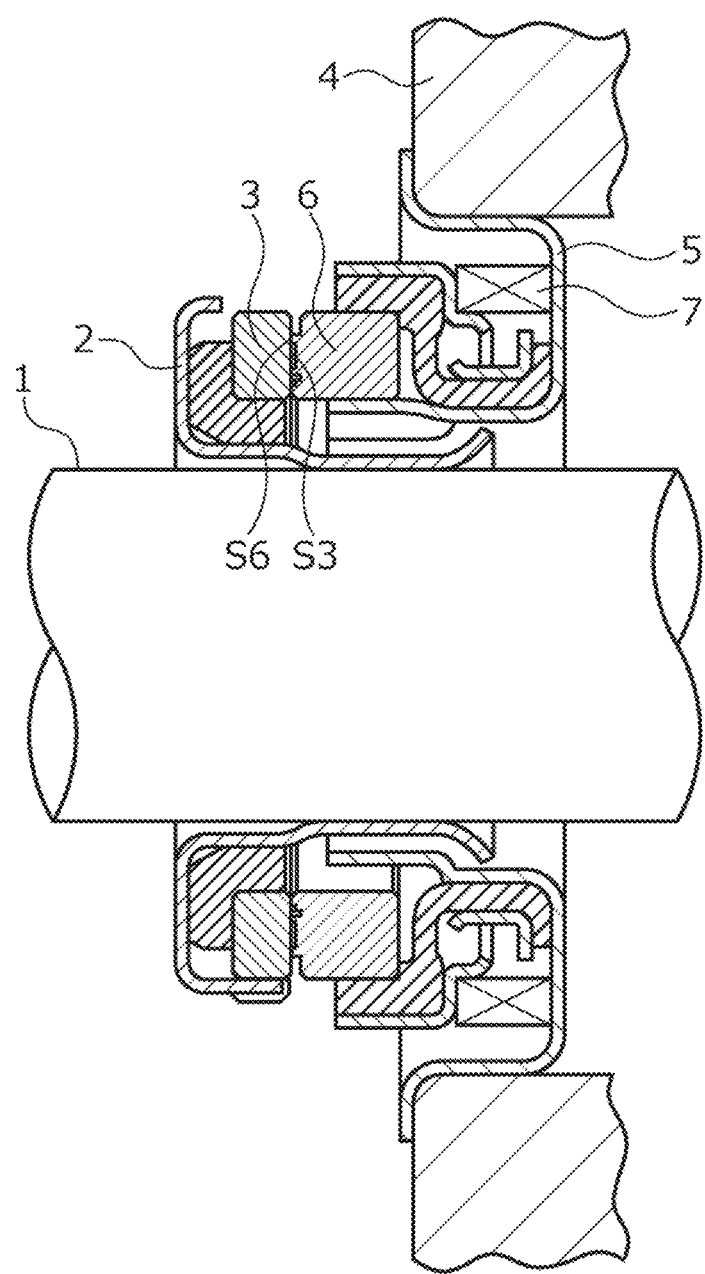
FIG. 1 is a cross-sectional view illustrating a structure of a rotating machine in which a mechanical seal including a sliding component according to a first embodiment of the present invention is used.

Modes for carrying out a sliding component according to the present invention will be described on the basis of the embodiments.

First Embodiment

A sliding component according to a first embodiment of the present invention will be described with reference to FIGS. 1 to 5.

A sliding component according to the first embodiment of the present invention includes a rotating seal ring 3 and a stationary seal ring 6 constituting a mechanical seal which is a shaft sealing device for sealing a rotating shaft of a rotating machine, for example, in automobiles, general industrial machines, or other seal fields. The rotating seal ring 3 and the stationary seal ring 6 are annular bodies of the present invention and both constitute the sliding component of the present invention. For convenience of description, in the drawings, grooves and the like formed on the sliding surface are indicated by dots.

As illustrated in FIG. 1, the mechanical seal mainly includes the rotating seal ring 3 and the stationary seal ring 6. The rotating seal ring 3 is formed in an annular shape and is provided in a rotating shaft 1 to be rotatable together with the rotating shaft 1 through a sleeve 2. The stationary seal ring 6 is formed in an annular shape and is provided in a seal cover 5 fixed to a housing 4 of the rotating machine not to be rotatable and to be movable in the axial direction. When a biasing means 7 biases the stationary seal ring 6 in the axial direction, a sliding surface S6 of the stationary seal ring 6 and a sliding surface S3 of the rotating seal ring 3 closely slide against each other.

That is, this mechanical seal is of an outside that prevents a sealed fluid on an inner peripheral side serving as a sealed fluid side of sliding surfaces S3 and S6 from leaking toward an outer peripheral side serving as a leakage side in the mutual sliding surfaces S3 and S6 of the rotating seal ring 3 and the stationary seal ring 6. Additionally, in this embodiment, the sealed fluid is a high-pressure gas such as dry gas, and a low-pressure gas such as air or dry gas exists on the outer peripheral side. Further, a supply source of lubricant Lu which is a liquid such as lubricating oil exists on the outer peripheral side and a small amount of lubricant Lu is supplied to the outer edges of the mutual sliding surfaces S3 and S6 of the rotating seal ring 3 and the stationary seal ring 6. For example, the method of supplying the lubricant Lu is dripping.

The rotating seal ring 3 and the stationary seal ring 6 are typically formed of SiC (as an example of hard material) or a combination of SiC and carbon (as an example of soft material). However, any sliding material can be applied insofar as it is used as a sliding material for a mechanical seal. The SiC includes a sintered body using boron, aluminum, carbon, or the like as a sintering aid and a material made of two or more types of phases having different components and compositions, examples of which include SiC in which graphite particles are dispersed, reaction-sintered SiC made of SiC and Si, SiC-TiC, and SiC-TiN. As the carbon, resin-molded carbon, sintered carbon, and the like can be used, including carbon in which carbon and graphite are mixed. In addition to the above sliding materials, a metal material, a resin material, a surface modification material (coating material), a composite material, and the like can also be applied.

Figure 2:
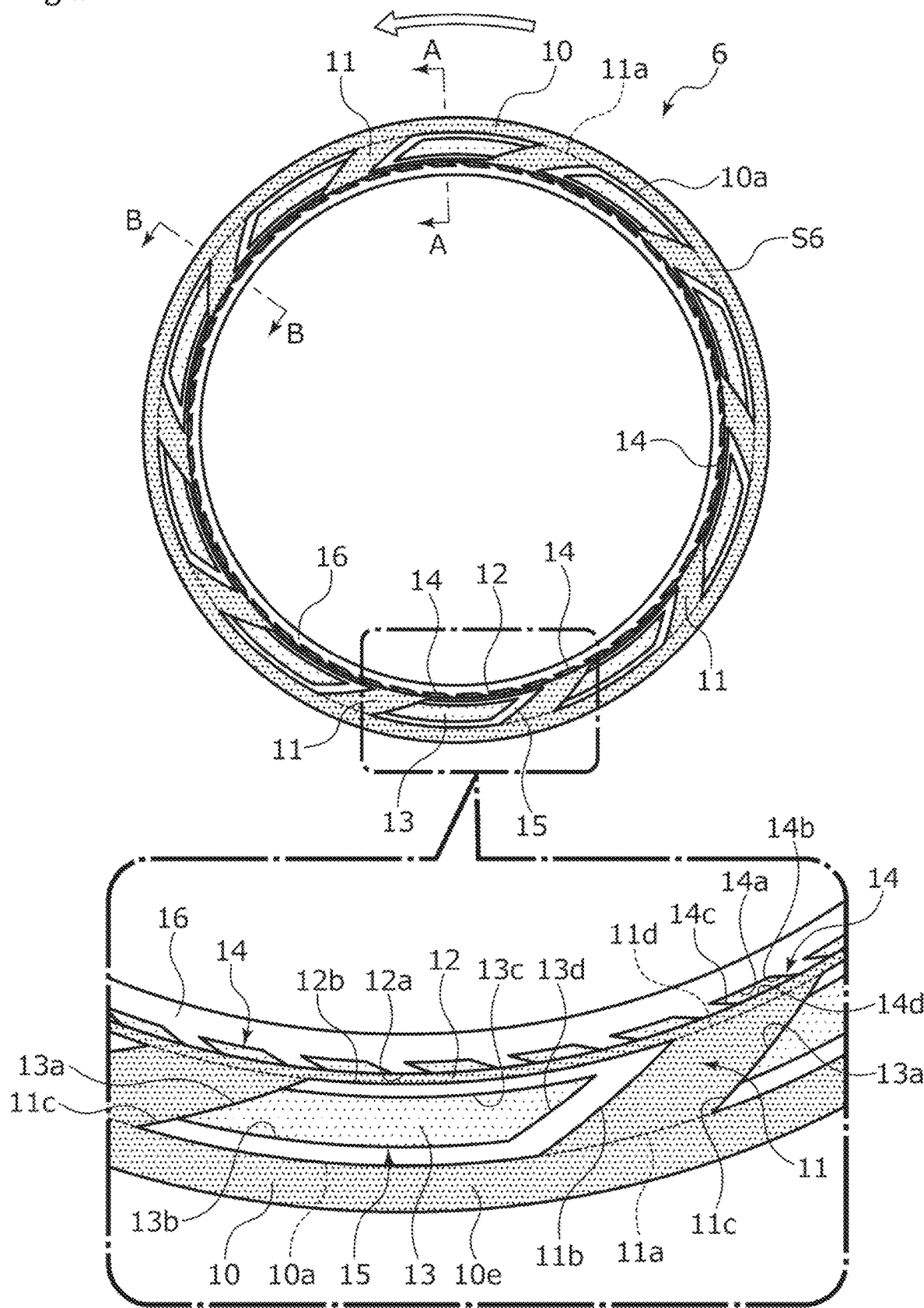
FIG. 2 is a view in which a stationary seal ring of the mechanical seal in the first embodiment is viewed from a sliding surface side.
Figure 3:
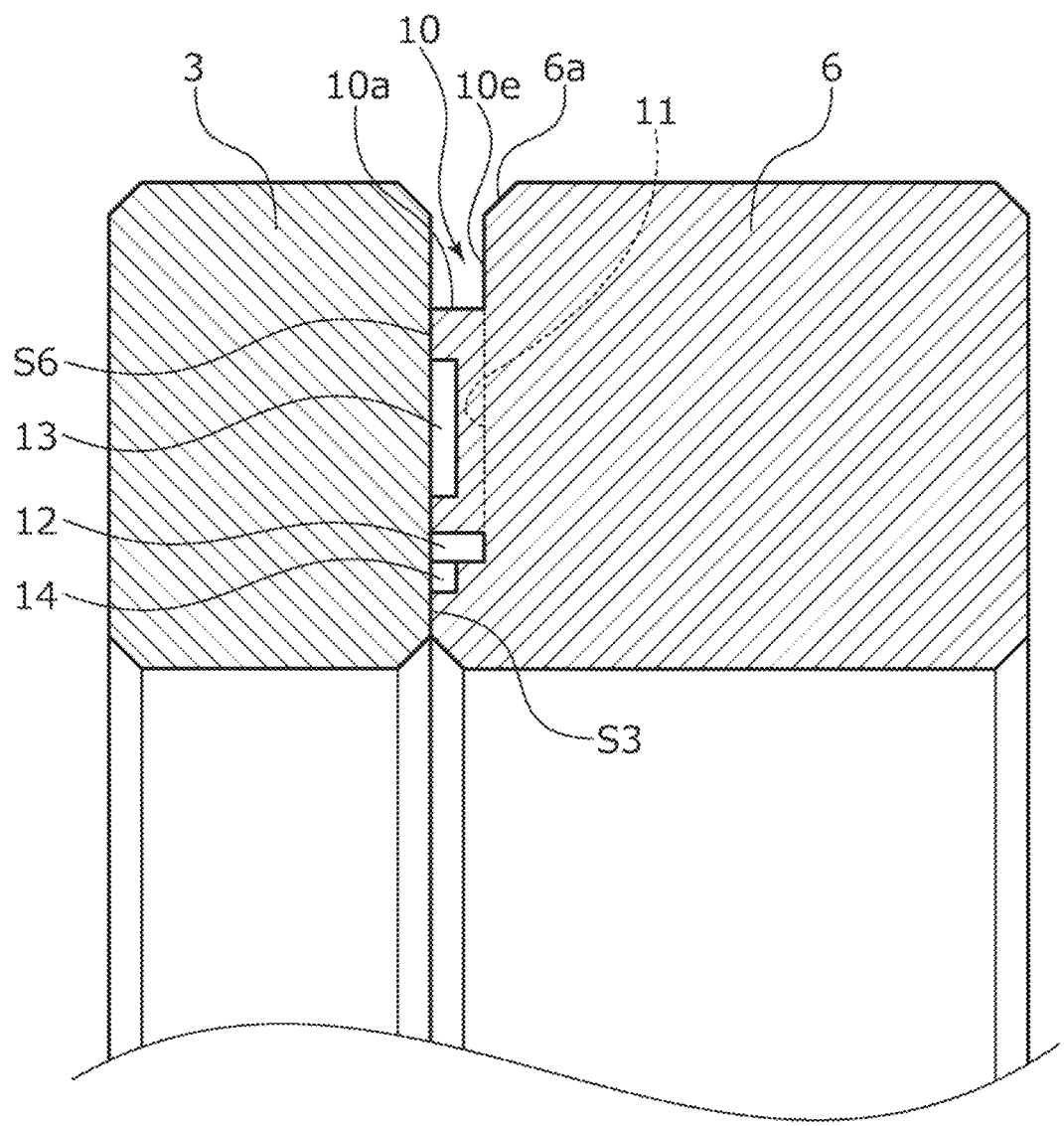
FIG. 3 is a cross-sectional view taken along a line A-A of FIG. 2 and illustrating a sliding state between a stationary seal ring and a rotating seal ring.

As illustrated in FIGS. 2 and 3, an annular recess portion 10, a supply groove 11, an annular groove 12, a Rayleigh step 13, and a spiral groove 14 are formed on the sliding surface S6 of the stationary seal ring 6. These can be formed by subjecting the sliding surface S6 to fine processing such as laser processing or sandblasting.

As illustrated in FIG. 2, in the sliding surface S6 of the stationary seal ring 6, an annular recess portion 10 which extends in the circumferential direction is formed on the outer radial edge portion to be concentric with the stationary seal ring 6. The annular recess portion 10 opens radially outward over the entire circumference and is formed to have the same width in the inner radial direction and the same depth in the radial and circumferential directions.

Specifically, the annular recess portion 10 is defined by an inner radial side wall 10a which follows the circumferential direction of the sliding surface S6 and extends in a direction orthogonal to the sliding surface S6 and a bottom surface 10e which is parallel to the sliding surface S6 and opens to the outer circumferential direction and the direction of the sliding surface S3 of the facing rotating seal ring 3. The annular recess portion 10 is formed to intersect an annular chamfered portion 6a (see FIG. 3) formed on the outer radial edge portion of the sliding surface S6 of the stationary seal ring 6.

A plurality of supply grooves 11 which are arranged separately in the circumferential direction are formed on the sliding surface S6 of the stationary seal ring 6. In the supply groove 11, a starting end 11a communicates with the outer radial side of the annular recess portion 10 and a terminal end 11d communicates with the annular groove 12 to be described later on the inner radial side. Further, the supply grooves 11 are formed side by side in the circumferential direction with the same interval width and are formed in a curved shape composed of a component extending in the circumferential direction while being inclined in the rotation direction and a component extending in the radial direction. Further, the supply groove 11 is defined by walls 11b and 11c which are curved in a recessed direction while being inclined in the rotation direction of the mating surface in a plan view and extend in a direction orthogonal to the sliding surface S6 and a bottom surface 11e (see FIG. 4) which is parallel to the sliding surface S6. The supply groove 11 communicates with the annular recess portion 10 at the same depth.

A single annular groove 12 which communicates with the terminal end 11d of the supply groove 11 and extends in the circumferential direction to be concentric with the stationary seal ring 6 is formed on the inner peripheral side of the sliding surface S6 of the stationary seal ring 6. The annular groove 12 communicates with the supply groove 11 at the same depth. The annular groove 12 is defined by an outer radial side wall 12b and an inner radial side wall 12a which follow the circumferential direction of the sliding surface S6 and extend in a direction orthogonal to the sliding surface S6 and a bottom surface.

As illustrated in FIG. 2, a plurality of land portions 15 which are separated in the radial direction and the circumferential direction while being surrounded over the entire circumference by the wall 10a defining the annular recess portion 10, the wall 11b and the wall 11c defining the supply groove 11, and the wall 12b defining the annular groove 12 are arranged at predetermined intervals in the circumferential direction.

The Rayleigh step 13 which serves as a dynamic pressure generation groove portion extending in the circumferential direction to be concentric with the stationary seal ring 6 is formed on the land portion 15. The Rayleigh step 13 includes a terminal end 13d in the rotation direction of the rotating seal ring 3 and is closed and defined by the wall 13b, the wall 13c, and the terminal end 13d respectively extending in parallel to the annular recess portion 10 and the annular groove 12 and the starting end 13a communicates with the supply groove 11. Additionally, the wall 13b and the wall 13c may not be parallel to the annular recess portion 10 and the annular groove 12 and may have a tapered shape or the like that gradually approaches toward the terminal end 13d.

The stationary seal ring 6 includes an annular land portion 16 which is isolated from the land portion 15 by the inner radial side of the annular groove 12. The spiral groove 14 which serves as a plurality of negative pressure generation groove portions arranged in the circumferential direction and separated from each other in the circumferential direction is formed on the annular land portion 16. The upper surfaces of the land portion 15 and the annular land portion 16 are substantially flush with each other. The annular land portion 16 is a substantially sealed position.

The spiral grooves 14 are formed side by side in the circumferential direction with the same interval width and are formed in a curved shape composed of a component extending in the circumferential direction while being inclined in a direction opposite to the rotation direction of the rotating seal ring 3 and a component extending in the radial direction. The spiral groove 14 is closed and defined by the walls 14b and 14c curved while being inclined in a direction opposite to the rotation direction in a plan view and extending in a direction orthogonal to the sliding surface S6, a starting end 14a, and a bottom surface and the terminal end 14d communicates with the annular groove 12.

Next, the flow of the lubricant supplied at the time of driving the rotating machine will be described with reference to FIGS. 4 and 5. In addition, a white arrow in FIG. 5 indicates the relative rotation direction of the stationary seal ring 6 which is a mating sliding component.

Figure 4:
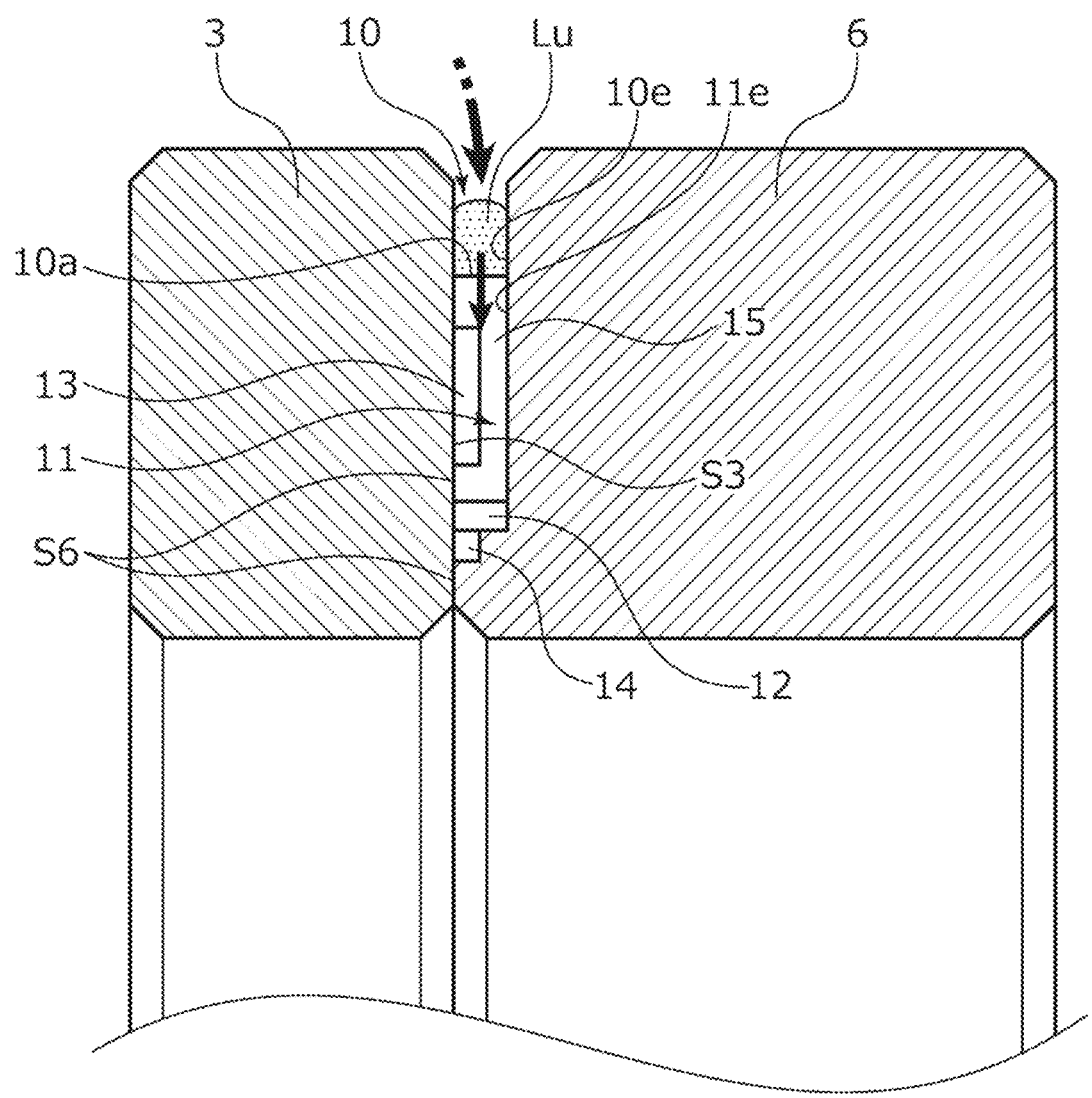
FIG. 4 is a cross-sectional view taken along a line B-B of FIG. 2 and illustrating a state in which a lubricant is supplied to an annular recess portion.
Figure 5:
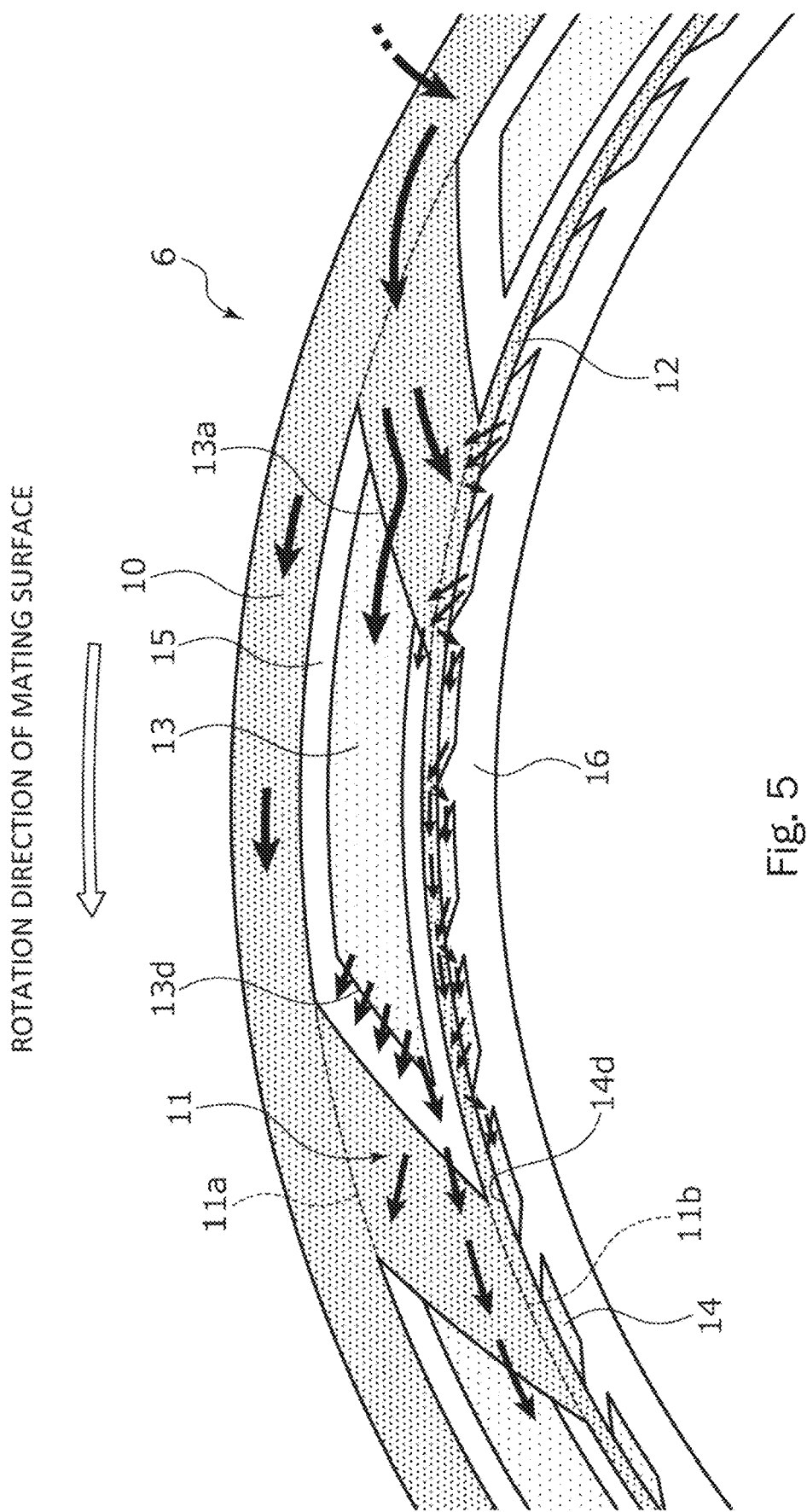
FIG. 5 is a conceptual diagram illustrating a movement of a fluid during the relative rotation between a stationary seal ring and a rotating seal ring in the first embodiment.

When a small amount of lubricant Lu is dripped onto the outer edges of the sliding surfaces S3 and S6 of the rotating seal ring 3 and the stationary seal ring 6, the lubricant Lu is introduced into the annular recess portion 10 which opens to the outer peripheral side of the sliding surface S6 of the stationary seal ring 6 as illustrated in FIG. 4. Since the annular recess portion 10 is continuously formed in the circumferential direction of the sliding surface S6, the lubricant Lu moves inside the annular recess portion 10 due to the relative rotation of the rotating seal ring 3 and the stationary seal ring 6, adheres to the wall 10a and the bottom surface 10e defining the annular recess portion 10, particularly, an intersection position of the wall 10a and the bottom surface 10e due to the surface tension, and is held inside the annular recess portion 10. Accordingly, the lubricant is not easily discharged toward the leakage side, that is, the supply side of the lubricant Lu. Further, the lubricant Lu has a convex profile due to its own viscosity and surface tension, and the liquid mass becomes large. Accordingly, a large amount of lubricant Lu can be adhered to and held at the intersection position of the wall 10a and the bottom surface 10e.

The lubricant Lu held inside the annular recess portion 10 moves along the circumferential direction inside the annular recess portion 10 during the relative rotation of the rotating seal ring 3 and the stationary seal ring 6 and a part of the lubricant enters in the inner radial direction between the sliding surfaces S3 and S6. Further, most of the others are introduced into the supply groove 11 whose starting end 11a communicates with the annular recess portion 10.

As illustrated in FIG. 2, the supply groove 11 includes a component extending in the rotation direction of the rotating seal ring 3 and a component extending in the radial direction, is formed to be inclined in the radial direction, and is formed in a gently curved shape. Most of the lubricant Lu at the center portion of the supply groove 11 in the radial direction is introduced into the Rayleigh step 13.

In the lubricant Lu introduced to the Rayleigh step 13, a dynamic pressure is generated on the side of the terminal end 13d inside the Rayleigh step 13 due to the relative rotation of the facing rotating seal ring 3 and the sliding surfaces S are slightly separated by the dynamic pressure. Accordingly, the entry of the lubricant Lu into the sliding surfaces S3 and S6 is prompted, a liquid film is formed between the sliding surfaces S3 and S6, and the lubricity between the sliding surface S3 of the rotating seal ring 3 and the sliding surface S6 of the stationary seal ring 6 is improved.

Further, the lubricant Lu introduced into the supply groove 11 in the inner radial direction is introduced into the annular groove 12 communicating with the terminal end 11d. While the lubricant Lu introduced to the annular groove 12 follows the relative rotation between the rotating seal ring 3 and the stationary seal ring 6, a part of the lubricant moves inward and outward in the radial direction and is supplied between the sliding surfaces S3 and S6, specifically, a facing position between the land portion 15 and the sliding surface S3 of the rotating seal ring 3 and a facing position between the annular land portion 16 and the sliding surface S3 of the rotating seal ring 3.

As described above, the annular land portion 16 is provided with the spiral groove 14 which extends in a direction in which a negative pressure is generated during the relative rotation of the rotating seal ring 3 and the stationary seal ring 6. Therefore, a part of the lubricant Lu supplied to the sliding surface S6 of the land portion 16 is returned to the annular groove 12 due to a negative pressure generated on the side of the terminal end 14d of the spiral groove 14 formed on the annular land portion 16 during the relative rotation of the rotating seal ring 3 and the stationary seal ring 6. Further, the lubricant Lu entering the spiral groove 14 is also pushed back toward the annular groove 12 due to a negative pressure generated on the side of the terminal end 14d of the spiral groove 14.

As described above, on the outer radial side of the sliding surface S3 of the rotating seal ring 3 and the sliding surface S6 of the stationary seal ring 6, the annular recess portion 10 which opens radially over the entire circumference is formed and the supply groove 11 of which the starting end 11a communicates with the annular recess portion 10 and which extends in the radial direction of the sliding surfaces S3 and S6 is formed. Since the annular recess portion 10 opens radially over the entire circumference, it is easy to take in the supplied lubricant Lu. Further, since a large amount of lubricant Lu is held in the annular recess portion 10 and the supply groove 11 communicating with the annular recess portion 10 and the lubricant Lu can be efficiently introduced between the sliding surfaces S3 and S6, high lubricity can be maintained for a long period of time.

Further, the supply groove 11 extends while being inclined in the relative rotation direction of the rotating seal ring 3 and the stationary seal ring 6, the lubricant Lu is in contact in two directions at the intersection position of the bottom surface 11e and the wall 11c of the supply groove 11, the lubricant Lu is pressed against the wall 11c due to the relative rotation, and the lubricant Lu is easily held at the intersection position of the bottom surface 11e and the wall 11c.

Further, the lubricant Lu supplied to the annular recess portion 10 by the supply groove 11 can be guided toward the center of the sliding surface S3 of the rotating seal ring 3 and the sliding surface S6 of the stationary seal ring 6 in the radial direction and the lubricity can be efficiently improved.

Further, a large amount of lubricant Lu can be held in the inner space of the annular recess portion 10 opening over the entire circumference, the supply groove 11 extends while being inclined in the relative rotation direction of the rotating seal ring 3 and the stationary seal ring 6, the lubricant Lu introduced into the supply groove 11 follows the relative rotation direction due to the relative rotation of the rotating seal ring 3 and the stationary seal ring 6, and the lubricant Lu supplied to the annular recess portion 10 can be easily guided toward the center of the sliding surfaces S3 and S6 in the radial direction. Therefore, it is possible to maintain high lubricity by efficiently using the lubricant supplied between the sliding surfaces S3 and S6 for a long period of time. In other words, this is particularly effective when there is no need to supply the lubricant Lu frequently and a large amount of lubricant Lu cannot be used due to the usage environment.

Further, since a plurality of supply grooves 11 are equally arranged in the circumferential direction of the sliding surface S6, it is possible to effectively hold the lubricant Lu over the entire circumference of the annular recess portion 10.

Further, both the annular recess portion 10 and the supply groove 11 are formed on the stationary seal ring 6 which is the same annular body. Accordingly, since the annular recess portion 10 and the supply groove 11 are integrally continuous, less turbulence occurs in the vicinity of the starting end 11a when the lubricant Lu moves from the annular recess portion 10 to the supply groove 11 and the lubricant Lu smoothly moves from the annular recess portion 10 toward the terminal end 11d of the supply groove 11.

Further, both the annular recess portion 10 and the supply groove 11 are formed on the stationary seal ring 6. Accordingly, since there is no influence of the centrifugal force in the stationary seal ring 6 fixed to the fixed side of the rotating machine, the discharge of the lubricant Lu entering the annular recess portion 10 and the supply groove 11 is suppressed and hence the lubricity can be maintained for a long period of time.

Further, since the annular recess portion 10 and the supply groove 11 communicate with each other at the same depth, the lubricant Lu can be smoothly guided from the annular recess portion 10 to the supply groove 11, the lubricant Lu is efficiently guided in the inner radial direction of the sliding surfaces S3 and S6, and hence the lubricity can be improved.

Further, since the sliding surface S6 is provided with the Rayleigh step 13 which communicates with the supply groove 11 and extends in the circumferential direction in which the facing rotating seal ring 3 rotates relatively, the lubricant Lu is guided from the supply groove 11 to the Rayleigh step 13 due to the relative rotation, the dynamic pressure is generated at the terminal end 13d inside the Rayleigh step 13, and the sliding surfaces S3 and S6 are separated from each other by the dynamic pressure to form a liquid film. Since the non-contact lubrication is performed, the lubricity is improved. Further, it is possible to hold the lubricant Lu in the annular recess portion 10 by effectively using the induced force due to the dynamic pressure and to improve the lubricity by efficiently guiding the lubricant Lu in the inner radial direction of the sliding surface S.

Further, since a single annular groove 12 following the circumferential direction communicates with the terminal end 11d of the supply groove 11 and the lubricant Lu is collected from the terminal end 11d of the supply groove 11 to circulate in the circumferential direction of the annular groove 12, it is possible to suppress the discharge of the lubricant Lu.

Further, the sliding component of this embodiment constitutes an outside mechanical seal which seals the leakage toward the outer peripheral side of the sealed fluid located on the inner radial side and the annular recess portion 10 is formed to open toward the outer radial side of the stationary seal ring 6 which is the supply side of the lubricant Lu. Therefore, it is possible to ensure a larger internal capacity of the annular recess portion compared to a case in which the annular recess portion is formed on an inside mechanical seal.

Additionally, in the above-described embodiment, it has been described such that both the annular recess portion 10 and the supply groove 11 are formed on the stationary seal ring 6, but the present invention is not limited thereto. For example, both of them may be formed on the sliding surface S3 of the rotating seal ring 3 or both the sliding surface S3 of the rotating seal ring 3 and the sliding surface S6 of the stationary seal ring 6.

Additionally, the annular recess portion 10 and the supply groove 11 may be separately formed on different annular bodies. For example, the annular recess portion may be formed on the rotating seal ring 3 and the supply groove 11 may be formed on the stationary seal ring.

Additionally, the supply groove 11 is not limited to the curved shape. For example, the supply groove may have a linear shape which is inclined toward the circumferential direction and the radial direction or may have a shape in which a line is bent.

Additionally, a case in which the sliding component of the above-described embodiment constitutes the mechanical seal has been described as an example, but the present invention is not limited thereto. For example, the sliding component can be used in a thrust bearing.

Additionally, in the above-described embodiment, it has been described such that the sliding component is an outside mechanical seal which prevents the leakage of the sealed fluid on the inner peripheral side serving as the sealed fluid side of the sliding surfaces S3 and S6 toward the outer peripheral side serving as the leakage side, but the present invention is not limited thereto. For example, the sliding component may be an inside mechanical seal which prevents the leakages of the sealed fluid on the outer peripheral side serving as the sealed fluid side of the sliding surfaces S3 and S6 toward the inner peripheral side serving as the leakage side. Then, the lubricant Lu may be supplied to any one of the inner peripheral side and the outer peripheral side of the sliding surfaces S3 and S6 and the annular recess portion 10 may open over the entire circumference on the supply side.

Second Embodiment

Next, a sliding component according to a second embodiment of the present invention will be described with reference to FIG. 6. In addition, the same components as those illustrated in the above embodiment are denoted by the same reference numerals, and overlapping descriptions are omitted.

Figure 6:
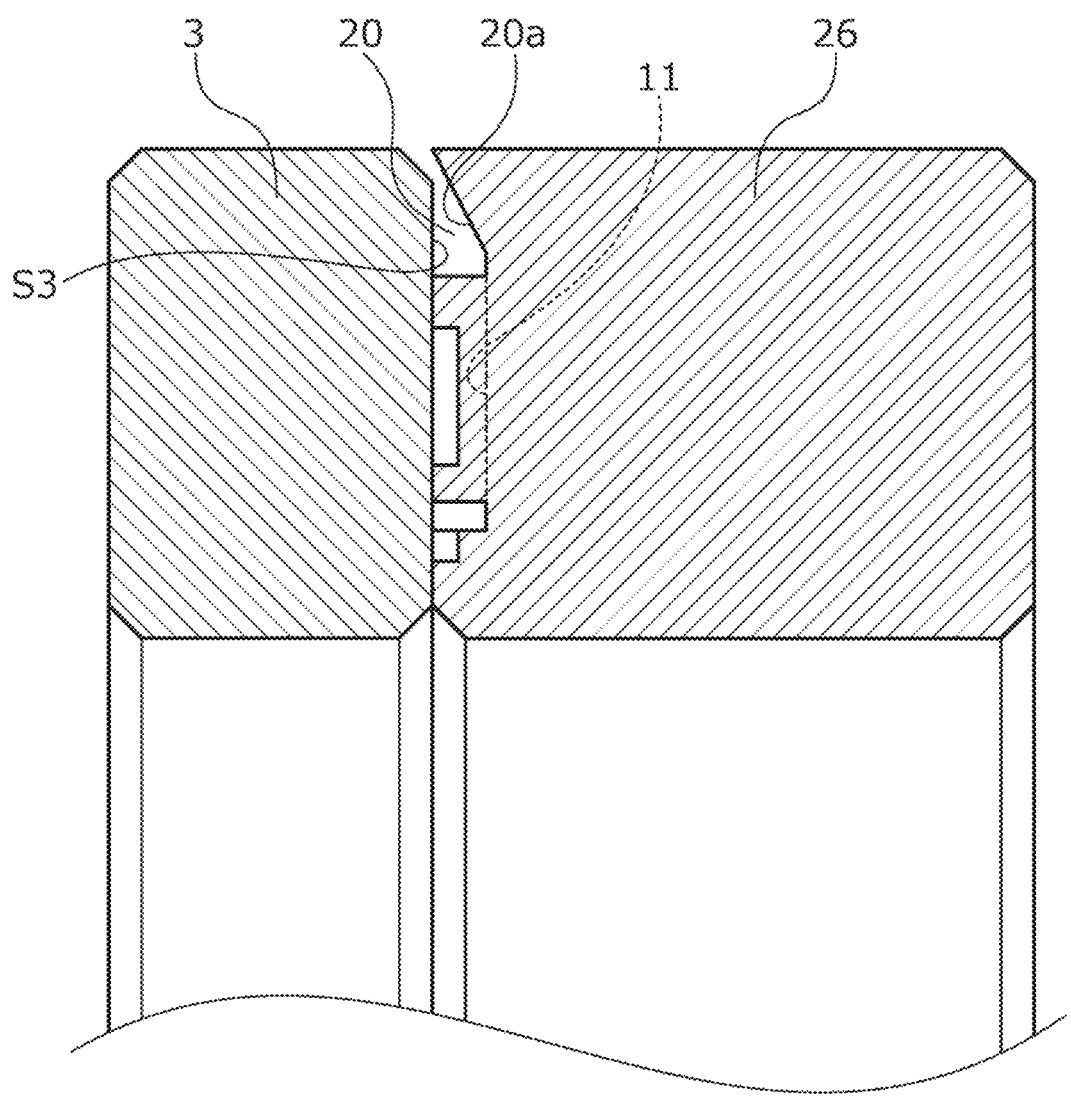
FIG. 6 is a cross-sectional view illustrating a sliding state between a stationary seal ring and a rotating seal ring included in a sliding component according to a second embodiment of the present invention.

As illustrated in FIG. 6, the annular recess portion 20 includes a tapered portion 20a which is formed to gradually approach the sliding surface S3 of the facing rotating seal ring 3 as it goes toward the opening. Accordingly, since the opening cross-sectional area gradually decreases as it goes toward the opening, it is easy to suppress the discharge of the lubricant Lu from the inside of the annular recess portion 20 toward the supply side.

Although the embodiments of the present invention have been described above with reference to the drawings, the specific configuration is not limited to these embodiments.

For example, the present invention is not limited to a configuration in which the supply grooves 11 are equally arranged in the circumferential direction. For example, the supply grooves may be formed at different intervals or one supply groove may be formed in the circumferential direction.

Further, the present invention is not limited to a configuration in which all supply grooves 11 formed in the circumferential direction communicate with the annular groove 12 at the terminal end 11d, and a part of the supply grooves 11 may be closed at the terminal end 11d.

Further, the annular recess portion 10 may be formed as a tapered surface which is formed to be gradually separated from the sliding surface S3 of the facing rotating seal ring 3 as it goes toward the opening. Accordingly, since the opening cross-sectional area gradually increases as it goes toward the opening, the annular recess portion 10 can easily take in the lubricant Lu.

Figure 7:
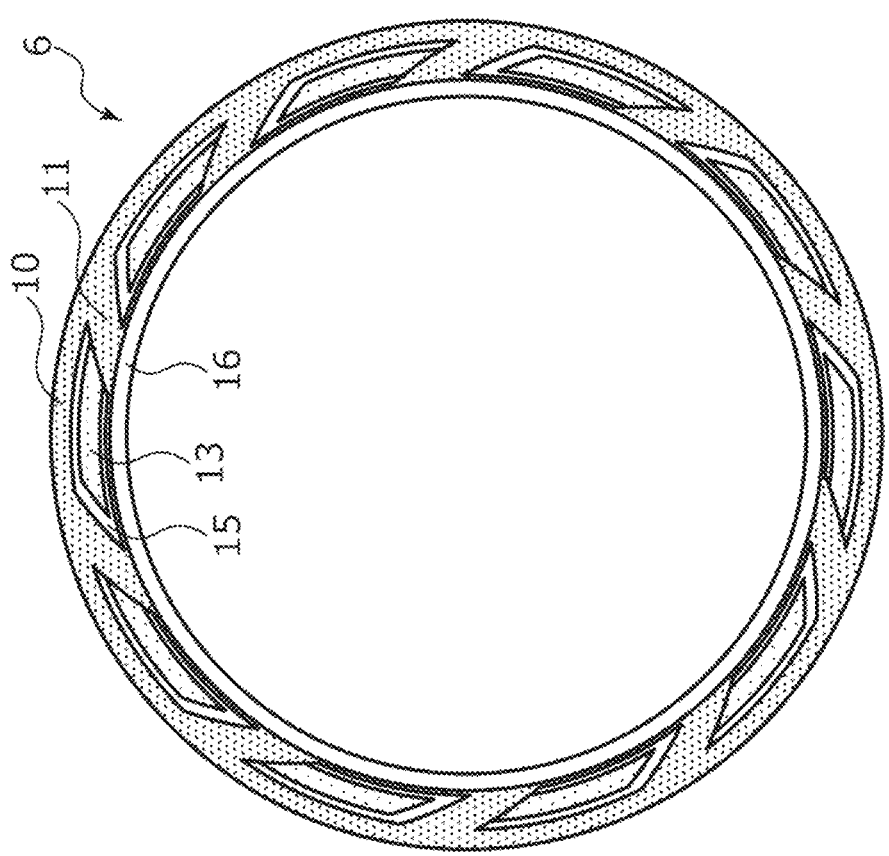
FIG. 7 is a view in which a stationary seal ring of a first modified example of the first and second embodiments is viewed from a sliding surface side.

Further, as illustrated in a first modified example of FIG. 7, the spiral groove 14 may be omitted.

Figure 8:
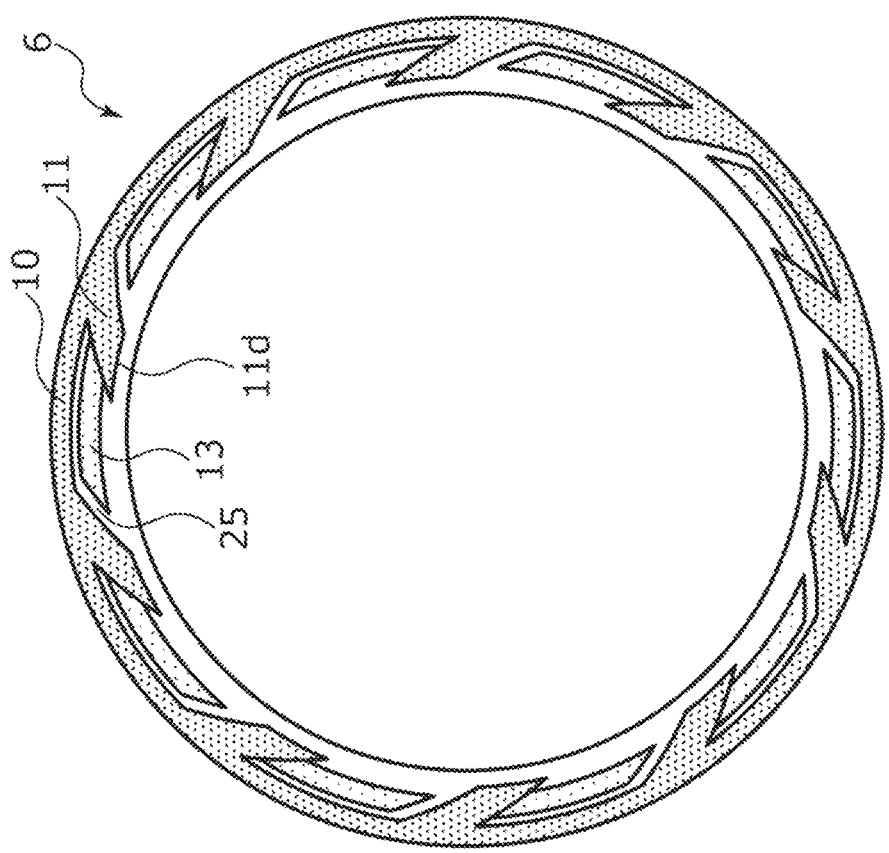
FIG. 8 is a view in which a stationary seal ring of a second modified example of the first and second embodiments is viewed from a sliding surface side.

Further, as illustrated in a second modified example of FIG. 8, the annular groove 12 may be also omitted in addition to the spiral groove 14. In this case, a continuous land portion 25 is formed between the adjacent supply grooves 11 in the circumferential direction and on the inner radial side of the closed terminal end 11d of the supply groove 11, that is, the sealed fluid side and a large substantial sliding area responsible for sealing performance can be ensured.

Figure 9:
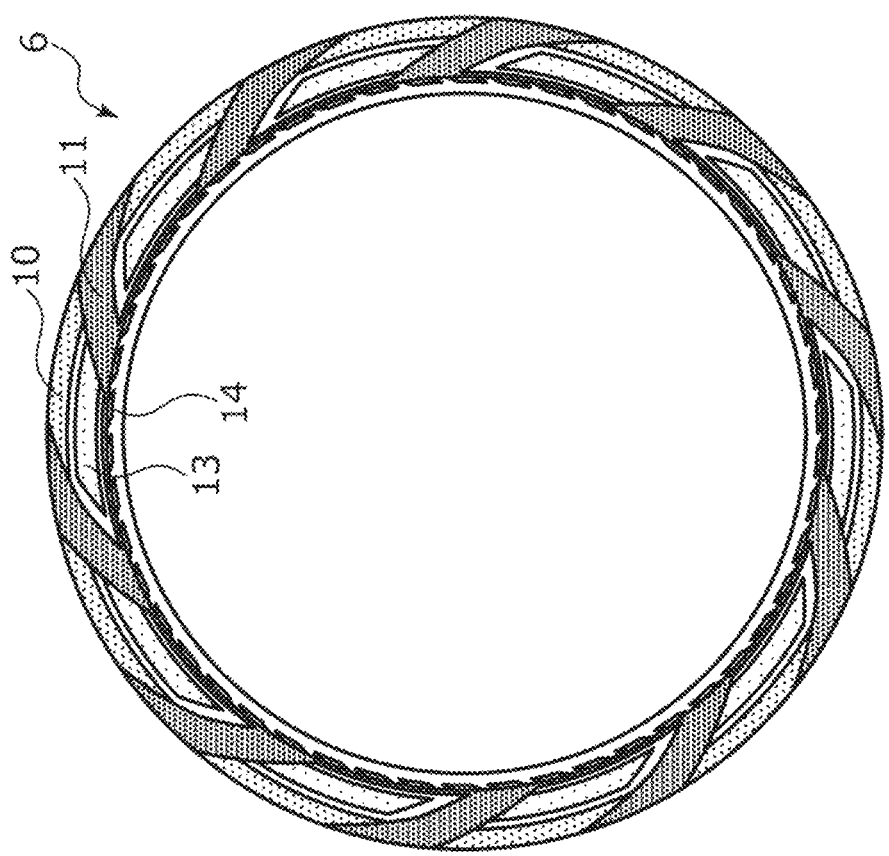
FIG. 9 is a view in which a stationary seal ring of a third modified example of the first and second embodiments is viewed from a sliding surface side.

Further, the annular recess portion 10 and the supply groove 11 may be formed at different depths. For example, as illustrated in a third modified example of FIG. 9, the supply groove 11 which is deeper than the annular recess portion 10 may be formed to open toward the outer radial side of the stationary seal ring 6. Accordingly, since the supply groove 11 can easily take in the lubricant Lu and a large amount of lubricant Lu can be held inside the supply groove 11, it is possible to maintain the lubricity even when the supply amount of lubricant Lu is small.

Figure 10:
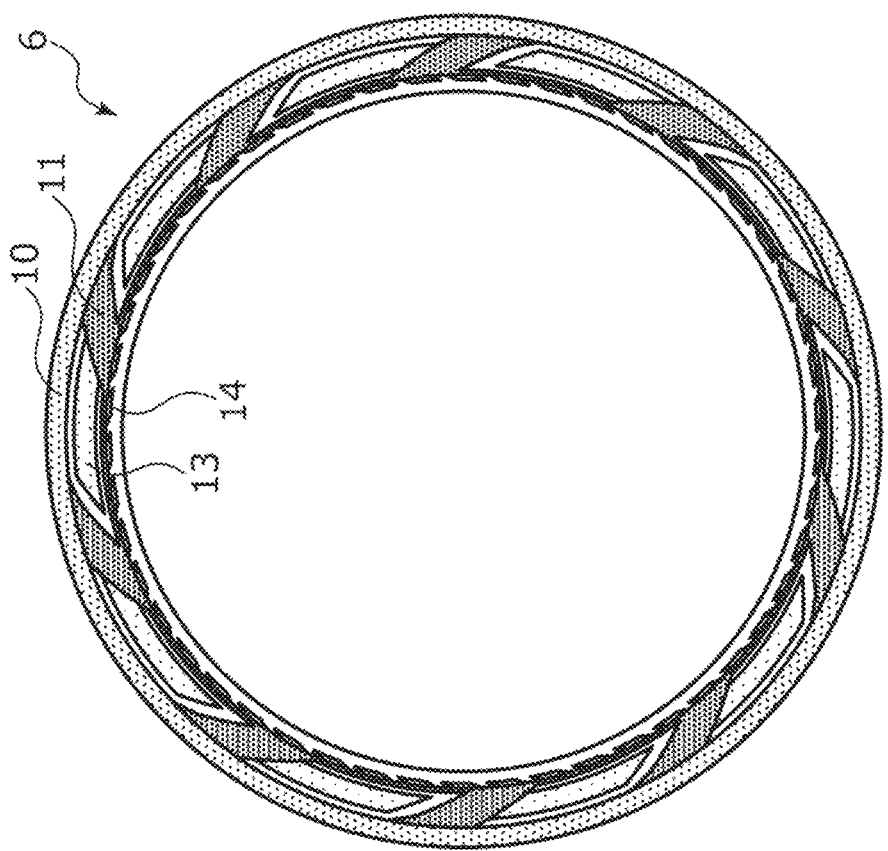
FIG. 10 is a view in which a stationary seal ring of a fourth modified example of the first and second embodiments is viewed from a sliding surface side.

Further, for example, as illustrated in a fourth modified example of FIG. 10, the supply groove 11 may be formed deeper than the annular recess portion 10 and may communicate with the inner radial side of the annular recess portion 10, that is, the side opposite to the opening of the annular recess portion 10 in the radial direction. Accordingly, since the capacity of the supply groove 11 can be increased and the cross-sectional area of the flow passage is rapidly reduced at the communicating portion between the supply groove 11 and the annular recess portion 10, the lubricant Lu does not easily return from the supply groove 11 to the annular recess portion 10 and the lubricant Lu can be easily held between the sliding surfaces S3 and S6.

Figure 11:
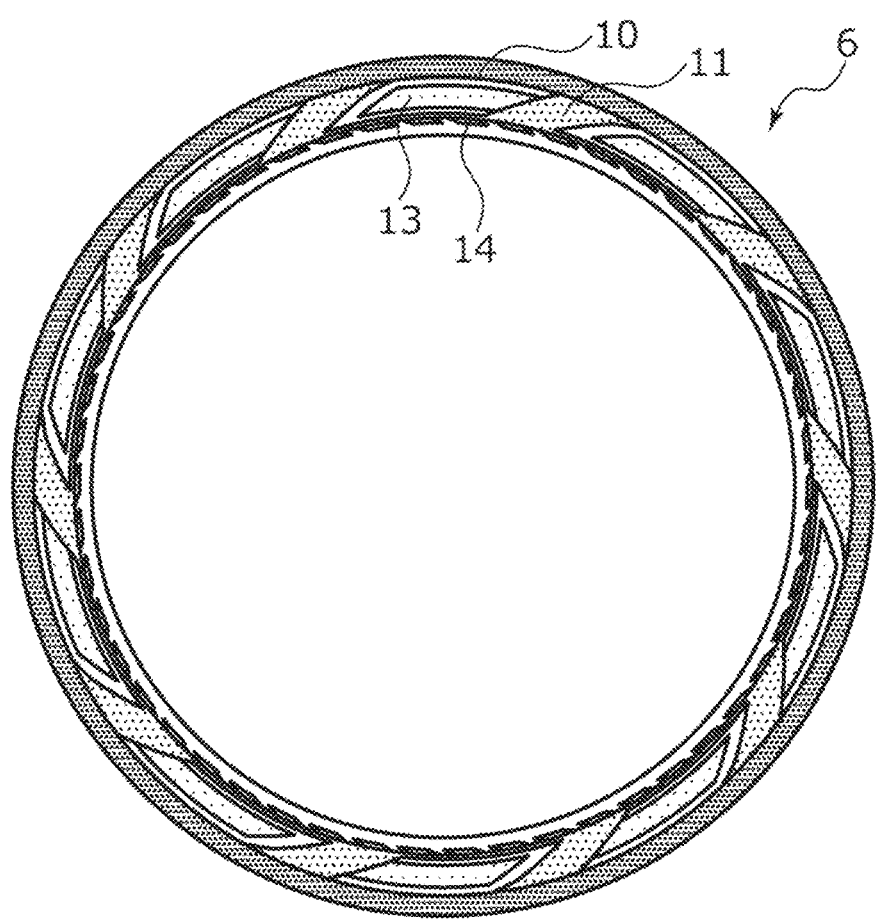
FIG. 11 is a view in which a stationary seal ring of a fifth modified example of the first and second embodiments is viewed from a sliding surface side.

Further, for example, as illustrated in a fifth modified example of FIG. 11, the supply groove 11 may be formed shallower than the annular recess portion 10 and the supply groove 11 may be formed deeper than the Rayleigh step 13. Accordingly, it is possible to increase the capacity of the annular recess portion 10 and to hold a large amount of lubricant Lu. In addition, since the supply groove 11 is shallow even when the supply amount of lubricant Lu is small, the lubricant Lu is likely to move inside the supply groove 11 in the radial direction and can be reliably guided to the Rayleigh step 13.

Further, the lubricant supply source may have any structure as long as the liquid can be supplied. For example, the oil used for the mechanism on the leak side may accumulate in the upper part of the casing in the form of droplets and drop irregularly as droplets.

REFERENCE SIGNS LIST

1 Rotating shaft
2 Sleeve
3 Rotating seal ring (annular body)
4 Housing
5 Seal cover
6 Stationary seal ring (annular body)
10 Annular recess portion
10a Wall
10e Bottom surface
11 Supply groove
11a Starting end
11b, 11c Wall
11d Terminal end
12 Annular groove
12a, 12b Wall
13 Rayleigh step (dynamic pressure generation groove portion)
13a Starting end
13b, 13c Wall
13d Terminal end
14 Spiral groove (negative pressure generation groove portion)
14a Starting end
14b, 14c Wall
14d Terminal end
15 Land portion
16 Annular land portion
20 Annular recess portion
20a Tapered portion
25 Land portion
Lu Lubricant (liquid)
S3, S6 Sliding surface

The invention claimed is:

1. A sliding component, comprising:
a pair of annular bodies arranged at relatively rotating positions to face each other when driving a rotating machine,
wherein an annular recess portion opening continuously and radially over entire circumference is formed on an inner radial side or an outer radial side of at least one of a pair of sliding surfaces of the sliding component and faces a remaining one of the sliding surfaces, and
a supply groove communicating with the annular recess portion and extending radially on the sliding surface is formed on at least one of the pair of sliding surfaces.

2. The sliding component according to claim 1,
wherein a dynamic pressure generation groove portion is provided to communicate with the supply groove and to extend in a circumferential direction in which the annular bodies rotate relatively to each other.

3. The sliding component according to claim 2,
wherein a single annular groove extending in the circumferential direction communicates with a terminal end of the supply groove.

4. The sliding component according to claim 3,
wherein at least one negative pressure generation groove portion is provided to communicate with the annular groove and to extend in a circumferential direction in which the annular body rotates relatively to each other.

5. The sliding component according to claim 2,
wherein a plurality of the supply grooves are equally arranged in the circumferential direction of the sliding surface.

6. The sliding component according to claim 2,
wherein the annular recess portion and the supply groove are formed on the annular body fixed to a fixed side of the rotating machine.

7. The sliding component according to claim 2,
wherein the supply groove is formed deeper than the annular recess portion and opens to an inner radial side or an outer radial side of at least one of the pair of sliding surfaces of the sliding component.

8. The sliding component according to claim 1,
wherein a single annular groove extending in the circumferential direction communicates with a terminal end of the supply groove.

9. The sliding component according to claim 8,
wherein at least one negative pressure generation groove portion is provided to communicate with the annular groove and to extend in a circumferential direction in which the annular body rotates relatively to each other.

10. The sliding component according to claim 9,
wherein the supply groove is formed shallower than the annular recess portion and deeper than the dynamic pressure generation groove portion communicating with the supply groove and extending in the circumferential direction in which the annular body rotates relatively to each other.

11. The sliding component according to claim 8,
wherein the supply groove is formed shallower than the annular recess portion and deeper than the dynamic pressure generation groove portion communicating with the supply groove and extending in the circumferential direction in which the annular body rotates relatively to each other.

12. The sliding component according to claim 1,
wherein a plurality of the supply grooves are equally arranged in the circumferential direction of the sliding surface.

13. The sliding component according to claim 12,
wherein the supply groove is formed shallower than the annular recess portion and deeper than the dynamic pressure generation groove portion communicating with the supply groove and extending in the circumferential direction in which the annular body rotates relatively to each other.

14. The sliding component according to claim 1,
wherein the annular recess portion and the supply groove are formed on the annular body fixed to a fixed side of the rotating machine.

15. The sliding component according to claim 14,
wherein the supply groove is formed shallower than the annular recess portion and deeper than the dynamic pressure generation groove portion communicating with the supply groove and extending in the circumferential direction in which the annular body rotates relatively to each other.

16. The sliding component according to claim 1,
wherein the supply groove is formed deeper than the annular recess portion and opens to an inner radial side or an outer radial side of at least one of the pair of sliding surfaces of the sliding component.

17. The sliding component according to claim 1,
wherein the supply groove is formed deeper than the annular recess portion and communicates with a side opposite to an opening of the annular recess portion.

18. The sliding component according to claim 1,
wherein the supply groove is formed shallower than the annular recess portion and deeper than the dynamic pressure generation groove portion communicating with the supply groove and extending in the circumferential direction in which the annular body rotates relatively to each other.

19. The sliding component according to claim 1,
wherein the annular recess portion and the supply groove communicate with each other at a same depth.

20. The sliding component according to claim 1,
wherein the sliding component constitutes an outside-typed mechanical seal which seals a leakage of a sealed fluid located on a radially inner peripheral side toward a radially outer peripheral side.

* * * * *